United States Patent
Akamatsu

(10) Patent No.: US 8,120,825 B2
(45) Date of Patent: Feb. 21, 2012

(54) DEVICE, APPARATUS, AND METHOD OF CONTROLLING OPTICAL SCANNING DEVICE

(75) Inventor: Hidenori Akamatsu, Tokyo (JP)

(73) Assignee: Ricoh Company Limited, Tokyo (JP)

( * ) Notice: Subject to any disclaimer, the term of this patent is extended or adjusted under 35 U.S.C. 154(b) by 529 days.

(21) Appl. No.: 12/405,452

(22) Filed: Mar. 17, 2009

(65) Prior Publication Data

US 2009/0237755 A1 Sep. 24, 2009

(30) Foreign Application Priority Data

Mar. 18, 2008 (JP) ................................. 2008-069234
Jan. 20, 2009 (JP) ................................. 2009-010332

(51) Int. Cl.
*H04N 1/46* (2006.01)
(52) U.S. Cl. ........ 358/505; 358/481; 358/488; 358/475; 399/388; 399/204; 347/235; 347/229; 359/205; 359/566
(58) Field of Classification Search ............. 358/481, 358/488, 475, 509, 296, 505, 518, 500; 399/49, 399/204, 388; 359/205, 566, 204; 347/235, 347/250, 229, 241
See application file for complete search history.

(56) References Cited

U.S. PATENT DOCUMENTS

| 6,947,065 | B2* | 9/2005 | Kaji .............................. 347/116 |
| 7,099,614 | B2* | 8/2006 | Koizumi ....................... 399/301 |
| 7,224,932 | B2* | 5/2007 | Omata .......................... 399/400 |
| 7,391,431 | B2 | 6/2008 | Ohkawara et al. |
| 7,460,159 | B2 | 12/2008 | Ohkawara et al. |
| 7,653,332 | B2* | 1/2010 | Ehara et al. ................... 399/167 |
| 7,663,785 | B2* | 2/2010 | Kim ............................ 358/481 |
| 7,809,294 | B2* | 10/2010 | Hattori et al. .................. 399/44 |
| 7,821,526 | B2* | 10/2010 | Nagata et al. ................. 347/131 |
| 7,974,568 | B2* | 7/2011 | Yamasaki et al. ............. 399/396 |
| 8,022,347 | B2* | 9/2011 | Tatsuno et al. ................ 250/205 |
| 8,036,582 | B2* | 10/2011 | Murata et al. ................. 399/302 |
| 2002/0176725 | A1* | 11/2002 | Sato et al. .................... 399/388 |
| 2004/0062584 | A1* | 4/2004 | Kaji ............................. 400/76 |

FOREIGN PATENT DOCUMENTS

| JP | 2576301 | 11/1996 |
| JP | 2002-86796 | 3/2002 |
| JP | 2006-130740 | 5/2006 |

* cited by examiner

*Primary Examiner* — Negussie Worku
(74) *Attorney, Agent, or Firm* — Oblon, Spivak, McClelland, Maier & Neustadt, L.L.P.

(57) ABSTRACT

A device, apparatus, and method of controlling operation of scanning performed by an optical scanning device are disclosed such that the color images are not shifted in the sub-scanning direction even when thinning processing is performed.

18 Claims, 12 Drawing Sheets

FIG. 1
PRIOR ART
(a)
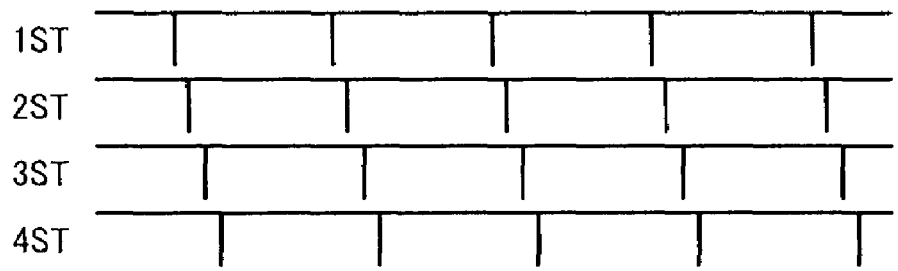
(b)
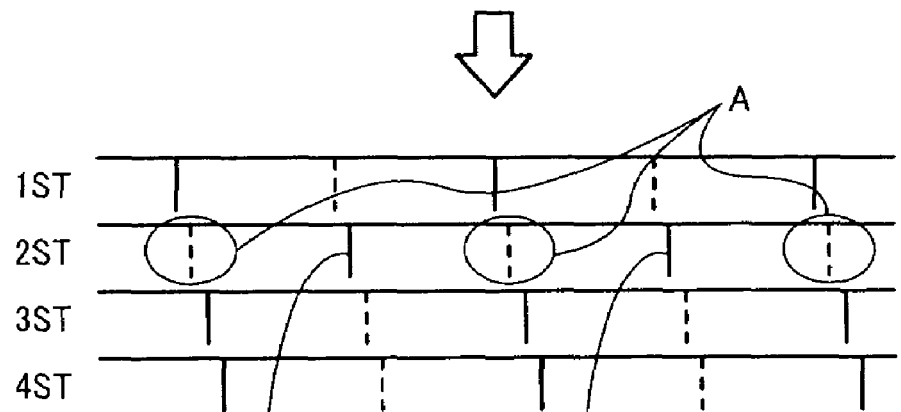
(c)
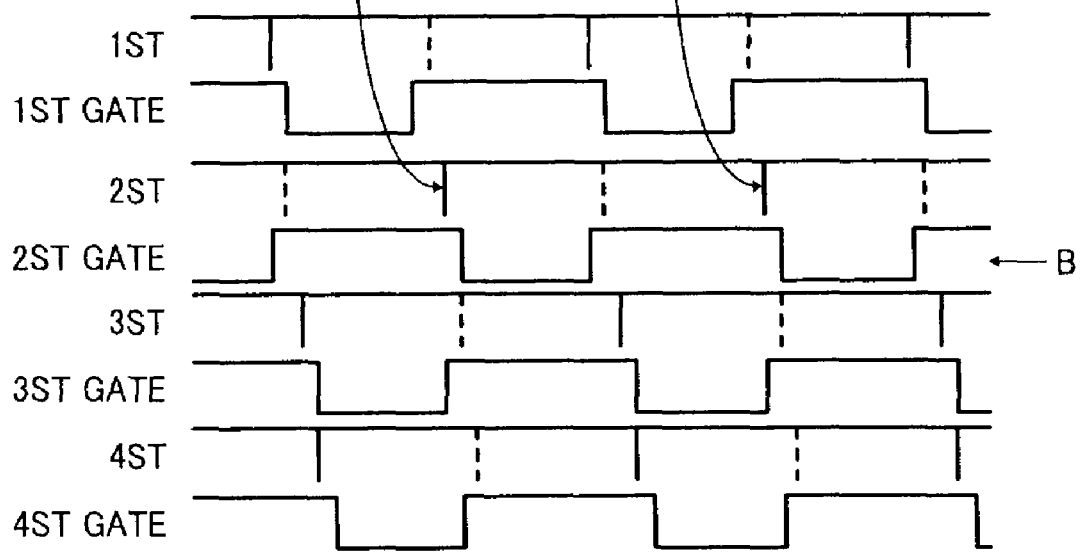

DEVICE, APPARATUS, AND METHOD OF CONTROLLING OPTICAL SCANNING DEVICE

CROSS-REFERENCE TO RELATED APPLICATIONS

This patent application is based on and claims priority under 35 U.S.C. §119 to Japanese Patent Application Nos. 2008-069234 filed on Mar. 18, 2008, and 2009-010332 filed on Jan. 20, 2009 in the Japanese Patent Office, the disclosure of which is hereby incorporated herein by reference.

FIELD OF THE INVENTION

The present invention generally relates to a device, apparatus, and method of controlling operation of scanning performed by an optical scanning device, and more specifically to a device, apparatus, and method of controlling operation of scanning performed by an optical scanning device having a rotatable polyhedron deflector.

BACKGROUND

As described in the Japanese Patent No. 2576301, an image forming apparatus may change its image forming speed without changing the rotational speed of a rotatable polyhedron deflector such as a polygon mirror. For example, thinning processing may be applied to reduce the image forming speed.

As illustrated in FIG. 1, thinning processing may be performed by thinning a synchronous signal such that one surface out of a predetermined number of surfaces of the polygon mirror is used for image forming. FIG. 1(a) illustrates a timing chart for explaining the time for outputting a plurality of synchronous signals for a plurality of image forming stations 1ST, 2ST, 3ST, and 4ST when the image forming apparatus performs image formation at a default speed. FIG. 1(b) illustrates a timing chart for explaining the time for outputting a plurality of synchronous signals when the image forming speed is reduced by half through the thinning processing. While the thinning processing allows the image forming speed to decrease without changing the rotational speed of the polygon mirror, it may cause the positional shift in color images respectively generated at the image forming stations 1ST, 2ST, 3ST, and 4ST such that the resultant full color image may have lower image quality. For example, as indicated by "A" in FIG. 1(b), when the synchronous signal for one image forming station 2ST is thinned out without considering synchronization with respect to the synchronous signals output for other image forming stations 1ST, 3ST, and 4ST, the synchronous signal that has been thinned out is not in synchronization with the other synchronous signals.

FIG. 1(c) is a timing chart for explaining the time at which image data is output. In addition to the synchronous signals 1ST to 4ST illustrated in FIG. 1(b), a plurality of gate signals 1ST GATE, 2ST GATE, 3ST GATE, and 4ST GATE is output. Referring to FIG. 1(c), the image data for a specific color is output when a predetermined time period passes after the synchronous signal for the corresponding one of the image forming stations 1ST, 2ST, 3ST, and 4ST is output. When the synchronous signal 2ST for the image forming station 2ST is not in synchronization with the synchronous signals for the other image forming stations 1ST, 3ST, and 4ST, the time for outputting the image data for the image forming station 2ST will be out of phase with respect to the time for outputting the image data for the other image forming stations 1ST, 3ST, and 4ST as indicated by "B" in FIG. 1. This causes the image data formed by the image forming station 2ST to be shifted by one line in the sub-scanning direction with respect to the image data formed by the other image forming stations 1ST, 3ST, and 4ST, thus causing the resultant full color image to have lower image quality.

SUMMARY

In view of the above, there is a need for a device, apparatus, and method of controlling operation of scanning performed by an optical scanning device such that the color images are not shifted in the sub-scanning direction even when thinning processing is performed.

Example embodiments of the present invention include an optical scanning device including a light source configured to irradiate a plurality of light beams; a rotatable polyhedron deflector configured to deflect the plurality of light beams to form a plurality of color images on a plurality of image forming sections at a first image forming speed; a plurality of synchronous detectors configured to detect the plurality of light beams deflected by the rotatable polyhedron deflector and to output a plurality of first synchronous signals; and an arbitration unit configured to receive an instruction for forming the plurality of color images at a second image forming speed without changing the rotational speed of the rotatably polyhedron deflector; to determine a timing for applying thinning processing to the plurality of first synchronous signals to generate a plurality of second synchronous signals; and to cause the light source to irradiate at least one of the plurality of light beams according to the plurality of second synchronous signals.

Example embodiments of the present invention include an image forming apparatus including a light source configured to irradiate a plurality of light beams; a rotatable polyhedron deflector configured to deflect the plurality of light beams to form a plurality of color images on a plurality of image forming sections at a first image forming speed; a plurality of synchronous detectors configured to detect the plurality of light beams deflected by the rotatable polyhedron deflector and to output a plurality of first synchronous signals; and an arbitration unit configured to receive an instruction for forming the plurality of color images at a second image forming speed without changing the rotational speed of the rotatably polyhedron deflector; to determine a timing for applying thinning processing to the plurality of first synchronous signals to generate a plurality of second synchronous signals; and to cause the light source to irradiate at least one of the plurality of light beams according to the plurality of second synchronous signals.

Example embodiments of the present invention include a method of controlling an optical scanning device, including: providing a light source to irradiate a plurality of light beams; deflecting the plurality of light beams using a rotatable polyhedron deflector to form a plurality of color images on a plurality of image forming sections at a first image forming speed; outputting a plurality of first synchronous signals when the plurality of light beams deflected by the rotatable polyhedron deflector is detected; receiving an instruction for forming the plurality of color images at a second image forming speed without changing the rotational speed of the rotatably polyhedron deflector; determining a timing for applying thinning processing to the plurality of first synchronous signals to generate a plurality of second synchronous signals; and causing the light source to irradiate at least one of the plurality of light beams according to the plurality of second synchronous signals.

In addition to the above-described example embodiments, the present invention may be practiced in various other ways, for example, as a recording medium storing a plurality of instructions which cause a processor to perform the above-described operation of controlling scanning.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a timing chart for explaining background thinning processing;

Figure 2:
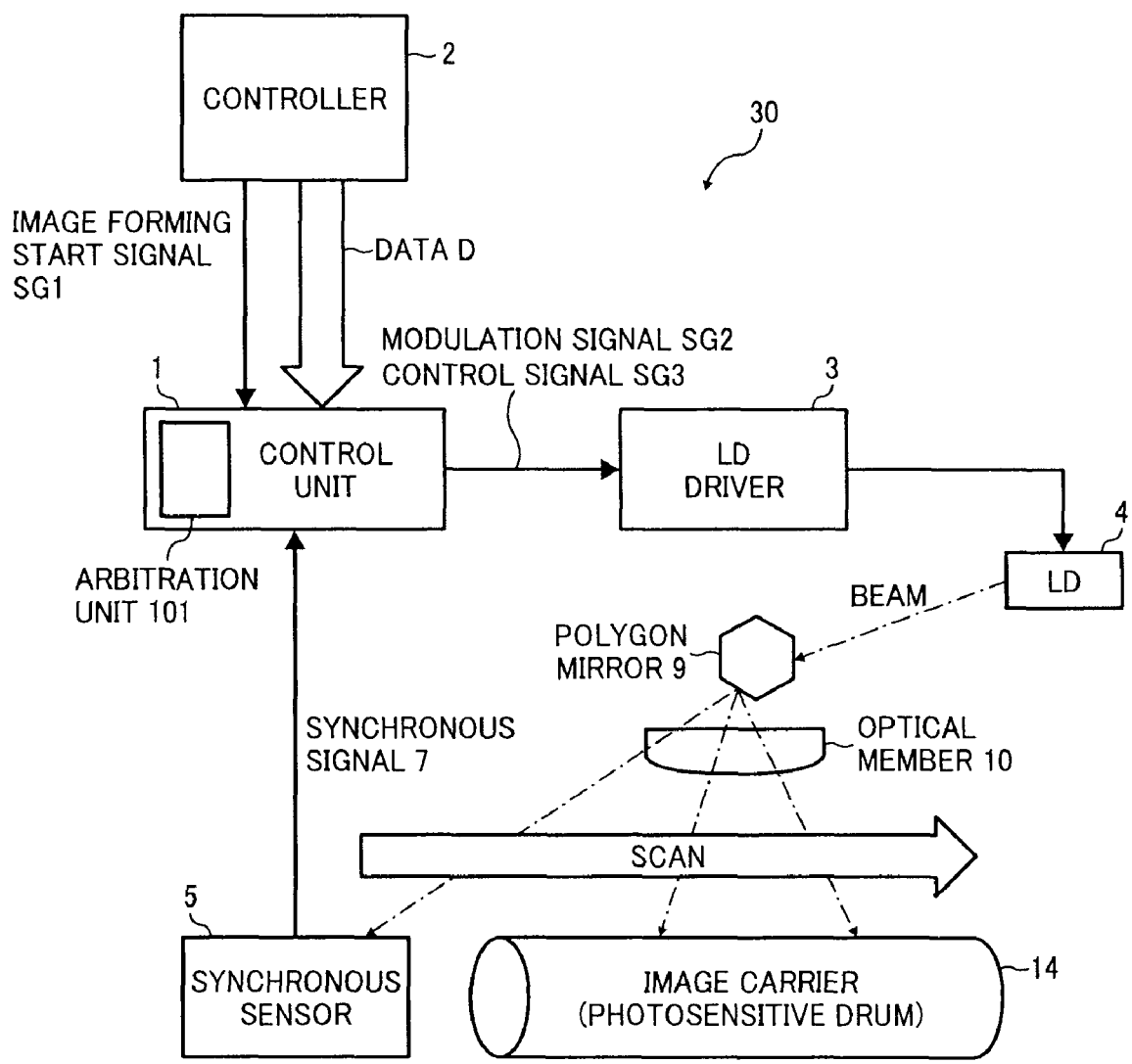
FIG. 2 is a schematic block diagram illustrating a selected portion of an optical scanning device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 2, an image writing control section of an optical scanning device 30, which performs operation of controlling optical scanning, is explained according to an example embodiment of the present invention. The optical scanning device 30 may be provided in an image forming apparatus 101 of FIG. 3. The optical scanning device 30 includes a control unit 1, a controller 2, a laser diode (LD) driver 3, a laser diode (LD) 4, a synchronous sensor 5, a polygon mirror 9, and an optical member 10.

The control unit 1 includes a central processing unit (CPU) and an ASIC. The control unit 1 receives an image forming start signal SG1 and image data D from the controller 2, modulates the image data D into a modulation signal SG2, and sends the modulation signal SG2 to the LD driver 3 at a predetermined time. For example, the modulation signal SG2 may be sent such that a desired number of lines of the image data D are sent at a time. The control unit 1 further outputs a control signal SG3 to the LD driver 3. The control signal SG3 may include any signal that controls on or off of the LD 4 such that a desired number of LDs are turned on or off at a desired timing. As described below, the control signal SG3 includes any one of an LDON signal SG6, a synchronous lighting positional control signal SG8, and an LD ON/OFF signal SG9.

Figure 3:
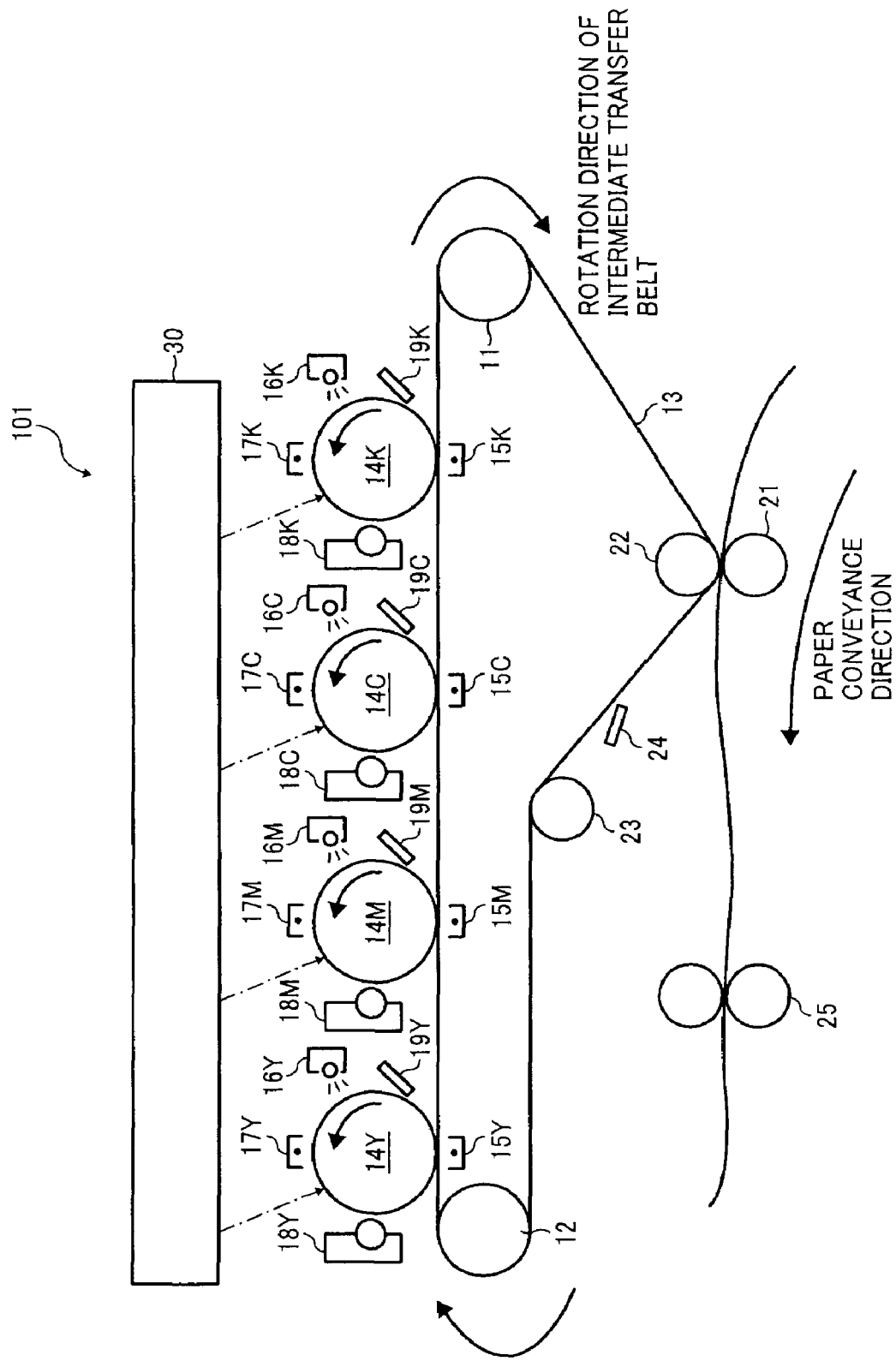
FIG. 3 is a schematic block diagram illustrating a selected portion of an image forming apparatus provided with the optical scanning device of FIG. 2, according to an example embodiment of the present invention.

The controller 2 controls image forming operation to be performed by the image forming apparatus 101 of FIG. 3, for example, according to a user instruction received through an operation device or a communication device provided in the image forming apparatus 101. The image forming operation includes image forming operation to form a latent image on the surface of the image carrier 14, which is performed by the optical scanning device 30. In addition, as described below referring to FIG. 3, the image forming operation includes image forming operation to form a toner image on the surface of an image carrier such as an intermediate transfer body or a recording sheet.

The LD driver 3 drives the LD 4 according to the modulation signal SG2 received from the control unit 1, which functions as an image forming signal. In this example, an optical light beam ("BEAM" in FIG. 2) irradiated by the LD 4 is deflected by the polygon mirror 9, which is rotatably driven by a polygon motor at a constant angular speed, toward the optical member 10. The polygon mirror 9 is provided with a plurality of mirror surfaces. The optical member 10, which includes an f-theta lens, scans the light beam to the image carrier 14, which may be implemented by a photosensitive drum, at a constant linear speed. The synchronous sensor 5 outputs a synchronous signal 7, which is a horizontal synchronous signal, to cause the control unit 1 to control image formation according to the synchronous signal 7. More specifically, the LD 4 is turned on so as to output the light beam, which scans the synchronous sensor 5 and the image writing section on the image carrier 14. When the light beam is detected, the synchronous sensor 5 outputs the synchronous signal 7. Based on the synchronous signal 7, the control unit 1 generates the control signal SG3, which is used to control on or off of the LD 4.

Referring to FIG. 3, a selected portion of the image forming apparatus 101 provided with the optical scanning device 30 of FIG. 1 is explained according to an example embodiment of the present invention. In this example, the image forming apparatus 101 is tandem-type image forming apparatus, which forms an image using an indirect transfer method. The image forming apparatus 101 may be implemented in various ways, for example, as a copier, printer, facsimile, or a multi-functional apparatus having a plurality of image forming functions.

The image forming apparatus 101 forms a full color image onto an intermediate transfer belt 13, which function as an intermediate transfer member, and further causes the full color image to be transferred onto a recording sheet. The intermediate transfer belt 13 is wound around a plurality of rollers including a drive roller 11, a first driven roller 12, and a second driven roller 22. The intermediate transfer belt 13 is driven by the drive roller 11 so as to rotate in the clockwise direction as indicated by the arrow illustrated in FIG. 3. The intermediate transfer belt 13 may be made of synthetic resin such as polyimide.

Still referring to FIG. 3, a plurality of photosensitive drums including a yellow photosensitive drum 14Y, a magenta photosensitive drum 14M, a cyan photosensitive drum 14C, and a black photosensitive drum 14K are arranged above the intermediate transfer belt 13. In this example, the yellow photosensitive drum 14Y is arranged in most upper stream.

A plurality of primary transfer devices including a yellow transfer device 15Y, a magenta transfer device 15M, a cyan transfer device 15C, and a black transfer device 15K are arranged below the photosensitive drums 14Y, 14M, 14C, and 14K so as to face the intermediate transfer belt 13.

For each of the photosensitive drums 14Y, 14M, 14C, and 14K (collectively referred to as the photosensitive drum 14), a plurality of image forming devices is provided along an outer circumferential surface of the photosensitive drum 14. For example, in the example case of the photosensitive drum 14Y, a discharge device 16Y, a charging device 17Y, a developing device 18Y, and a cleaning device 19Y are provided in this order with respect to the direction of rotation of the photosensitive drum 14Y. The discharge device 16Y discharges a surface of the photosensitive drum 14Y The charging device 17Y charges the surface of the photosensitive drum 14Y. The developing device 18Y develops a latent image formed on the surface of the photosensitive drum 14Y into a developed image such as a toner image. The cleaning device 19Y removes residual toner remained on the surface of the photosensitive drum 14Y after the toner image is transferred from the surface of the photosensitive drum 14Y onto the intermediate transfer belt 13 at a nip portion formed with the primary transfer device 15Y. For example, the cleaning device 19Y may be implemented by a blade or a brush. As illustrated in FIG. 3, the photosensitive drum 14M is provided with the image forming devices including a discharge device 16M, a charging device 17M, a developing device 18M, and a cleaning device 19M. The photosensitive drum 14C is provided with the image forming devices including a discharge device 16C, a charging device 17C, a developing device 18C, and a cleaning device 19C. The photosensitive drum 14K is provided with the image forming devices including a discharge device 16K, a charging device 17K, a developing device 18K, and a cleaning device 19K.

In this example, the photosensitive drums 14Y, 14M, 14C, and 14K and the plurality of image forming devices provided for each one of the photosensitive drums 14Y, 14M, 14C, and 14K may be respectively referred to as a first image forming station 1ST, a second image forming station 2ST, a third image forming station 3ST, and a fourth image forming station 4ST.

Referring to FIG. 3, the image forming apparatus 101 further includes a secondary transfer device such as a second transfer roller 21 at the position that faces the second driven roller 22. The secondary transfer roller 21 forms a nip portion with the second driven roller 22 via the intermediate transfer belt 13. At the nip portion, the toner image formed on the intermediate transfer belt 13 is transferred onto a recording medium, such as a recording sheet, transferred by the secondary transfer roller 21. The recording sheet having the toner image thereon is transferred to a fixing device 25, which is provided downstream the secondary transfer roller 21 in the paper conveyance direction. The fixing device 25 fixes the toner image onto the recording sheet by heat and pressure.

The image forming apparatus 101 further includes a tension roller 23 at a desired position such that it stretches the intermediate transfer belt 13. Due to the force applied by the tension roller 23 against the intermediate transfer belt 13, the drive power from the drive roller 11 is efficiently transmitted to the intermediate transfer belt 13.

The image forming apparatus 101 further includes a cleaning device 24 between the secondary driven roller 22 and the tension roller 23. The cleaning device 24 removes residual toner remained on the surface of the intermediate transfer belt 13 after the toner image is transferred from the intermediate transfer belt 13 onto the recording sheet.

The image forming apparatus 101 further includes the optical scanning device 30 above the photosensitive drums 14Y, 14M, 14C, and 14K. The optical scanning device 30 irradiates four light beams onto the respective surfaces of the photosensitive drums 14Y, 14M, 14C, and 14K to respectively form a yellow latent image, a magenta latent image, a cyan latent image, and a black latent image. The optical scanning device 30 is provided with a light source such as the LD 4 of FIG. 2. Alternatively, the light source may be implemented by a light emitting diode (LED), electro luminescence (EL), etc. Once the latent images are formed on the surfaces of the photosensitive drums 14Y, 14M, 14C, and 14K, the latent images are developed into toner images by the developing devices 18Y, 18M, 18C, and 18K. The toner images are then sequentially transferred to the intermediate transfer belt 13 to form a composite image, which is referred to as a full color image. The full color image formed on the intermediate transfer belt 13 is further transferred to the recording sheet at the nip portion formed between the secondary transfer roller 21 and the second driven roller 22. The full color image is fixed by the fixing device 25 onto the recording sheet. The recording sheet having the fixed full color image thereon may be discharged from the image forming apparatus 101 as a printed sheet.

Further, as described below, the optical scanning device 30 is capable of applying thinning processing such that the image forming apparatus 101 does not have to change the rotational speed of the polygon mirror 9 even when there is a need for changing the image forming speed, for example, through changing the processing speed or the scanning density in the sub-scanning direction. In this example, the processing speed includes, for example, the drum surface speed of the photoconductive drum 12, and the transfer speed of the recording sheet.

For example, when forming the image data onto thick paper or specialized paper such as an OHP, the energy that requires for fixing is greater than the case in which the image data is to be formed onto normal paper. In order to increase the amount of energy per unit area of the paper, the image forming speed, such as the fixing speed, is reduced. For example, referring back to FIG. 2, the controller 2 may receive a user instruction for forming an image on the thick paper, and output the image forming start signal SG1 to cause the control unit 1 to form a latent image at a target image forming speed, which is less than the default image forming speed. When the instruction is received, the control unit 1 applies thinning processing to the synchronous signal 7 to generate a thinned synchronous signal 7 such that the control signal SG3 to be output from the control unit 1 is generated according to the thinned synchronous signal 7. The LD 4 is turned on or off at a timing determined by the control signal SG3 such that only a predetermined number of surfaces of the polygon mirror 9 is used for image formation to cause image forming operation to be performed at the target image forming speed.

Further, in this example, the control unit 1 is provided with an arbitration unit 101, which determines a timing for applying thinning processing, and applies thinning processing at the determined timing. With the arbitration unit 101, thinning processing is performed at the desired timing while suppressing the positional shifts in color images.

Further, in this example, the image forming apparatus 101 further includes a positioning sensor, which detects a test pattern formed on the intermediate transfer belt 13 and sends a detection signal to an image writing control section, such as to the controller 2 of FIG. 2. Based on the detection signal, the image writing control section controls image forming operation such as to suppress the shift in color images. In this example, the positioning sensor may be provided at any position between the primary transfer device 15K and the secondary transfer roller 22.

The image forming apparatus 101 may be implemented in various other ways. For example, the image forming apparatus 101 may be implemented by a tandem-type image forming apparatus, which forms an image using a direct transfer method. In such case, the intermediate transfer belt 13 may be replaced by an electrostatic absorption member that transfers the recording sheet such that the toner images are directly transferred onto the recording sheet to form the full color image thereon.

Figure 4:
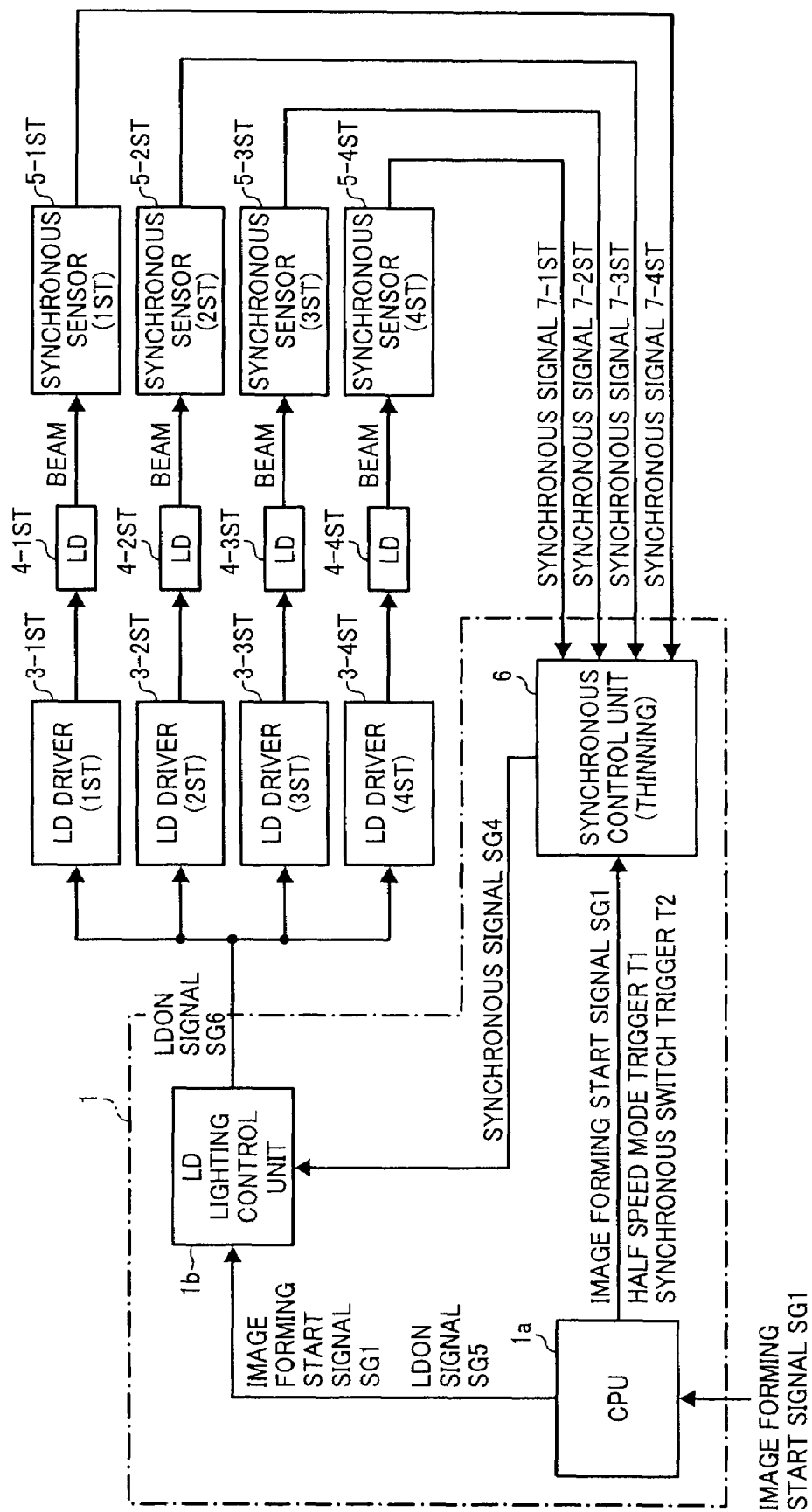
FIG. 4 is a block diagram illustrating a control section of the optical scanning device of FIG. 2, according to an example embodiment of the present invention.

Referring to FIG. 4, an example structure of the image writing control section of FIG. 2 is explained according to an example embodiment of the present invention.

The control unit 1 includes a central processing unit (CPU) 1a, and the arbitration unit 101 including an LD lighting control unit 1b and a synchronous control unit 6. The LD driver 3, the LD 4, and the synchronous sensor 5 are provided for each one of the image forming stations ST1 to ST4. As illustrated in FIG. 4, the synchronous sensors 5-1ST, 5-2ST, 5-3ST, and 5-4ST respectively output synchronous signals 7-1ST, 7-2ST, 7-3ST, and 7-4ST to the synchronous control unit 6. The synchronous control unit 6 applies thinning processing to the synchronous signals 7-1ST, 7-2ST, 7-3ST, and 7-4ST to output a plurality of synchronous signals SG4. The LD lighting control unit 1b outputs an LDON signal SG6, which is generated based on the plurality of synchronous signals SG4.

The CPU 1a inputs a half speed mode trigger signal T1 or a synchronous switch trigger signal T2 to the synchronous control unit 6. The synchronous control unit 6 determines a timing for applying thinning processing based on the signal T1 or T2 received from the CPU 1a. The synchronous control unit 6 further applies thinning processing, at the determined timing, to the synchronous signals 7-1ST, 7-2ST, 7-3ST, and 7-4ST received from the synchronous sensors 5-1ST, 5-2ST, 5-3ST, and 5-4ST to generate the plurality of synchronous signals SG4, and outputs the synchronous signals SG4 to the LD lighting control unit 1b. The LD lighting control unit 1b generates the second LDON signal SG6 based on the first LDON signal SG5 output by the CPU 1a, according to the synchronous signals SG4 output from the synchronous control unit 6. The second LDON signal SG6, which is used to irradiate the LD 4, is output respectively to the LD driver 3-1ST, 3-2ST, 3-3ST, and 3-4ST to cause a selected one of the LD 4-1ST, 4-2ST, 4-3ST, and 4-4ST to turn on at the time determined by the second LDON signal SG6 to write image data according to a modulation signal SG2. When the image forming start signal SG1 is output by the controller 2, the CPU 1a outputs the image forming stat signal SG1 respectively to the LD lighting control unit 1ba and the synchronous control unit 6 to cause image forming operation to be initiated.

As described above, the CPU 1a controls the LD driver 3 through the synchronous control unit 6 and/or the LD lighting control unit 1b to turn on or off the LD 4 such that image formation is performed at a desired image forming speed. The LD 4 irradiates a light beam to the photosensitive drum 14, and to the synchronous sensor 5. The synchronous sensor 5 outputs the synchronous signal 7 to the synchronous control unit 6. The synchronous control unit 6 applies thinning processing according to the signal received from the CPU 1a, which indicates a target image forming speed. For example, when the image forming speed is to be reduced by half, that is, when the half speed mode trigger signal T1 is input by the CPU 1a, the synchronous control unit 6 determines a timing for applying thinning processing, applies thinning processing to the synchronous signals 7-1ST, 7-2ST, 7-3ST, and 7-4ST at the determined timing to output the synchronous signal SG4 such that every other surface of the polygon mirror 9 is used for image formation.

More specifically, in this example, the synchronous control unit 6 determines the timing for applying thinning processing such that the synchronous signals 7-1ST, 7-2ST, 7-3ST, and 7-4ST, which are subjected for masking or thinning processing, are synchronous with one another. Since the plurality of the synchronous signals 7-1ST, 7-2ST, 7-3ST, and 7-4ST, which have been masked or thinned out, are synchronous with one another, the synchronous signals 7-1ST, 7-2ST, 7-3ST, and 7-4ST, which are input to the synchronous control unit 6 subsequently after the synchronous signals 7-1ST, 7-2ST, 7-3ST, and 7-4ST that have been masked or thinned out, are synchronous with one another. As a result, the synchronous signals SG4, which are output by the synchronous control unit 6 to the LD lighting control unit 1b, are synchronous with one another.

The above-described thinning processing may be applied so as to reduce the image forming speed by any factor. When the image forming speed is to be reduced by one third, the synchronous control unit 6 applies thinning processing to the synchronous signals 7-1ST, 7-2ST, 7-3ST, and 7-4ST such that the synchronous signal SG4 is output when one out of three synchronous signals 7 that are subsequently input to the synchronous control unit 6 is detected.

Further, in this example, the LD 4 may include more than one LD element. For example, the LD 4 may be implemented by an LD array having a plurality of LD elements.

Further, in this example, a plurality of beams or signals, respectively output from the plurality of LD drivers 3-1ST, 3-2ST, 3-3ST, and 3-4ST, or from the plurality of LDs 4-1ST, 4-2ST, 4-3ST, and 4-4ST, may be caused to input to any desired number of synchronous sensors 5. The number of synchronous sensors 5 is thus not limited to four.

Figure 5:
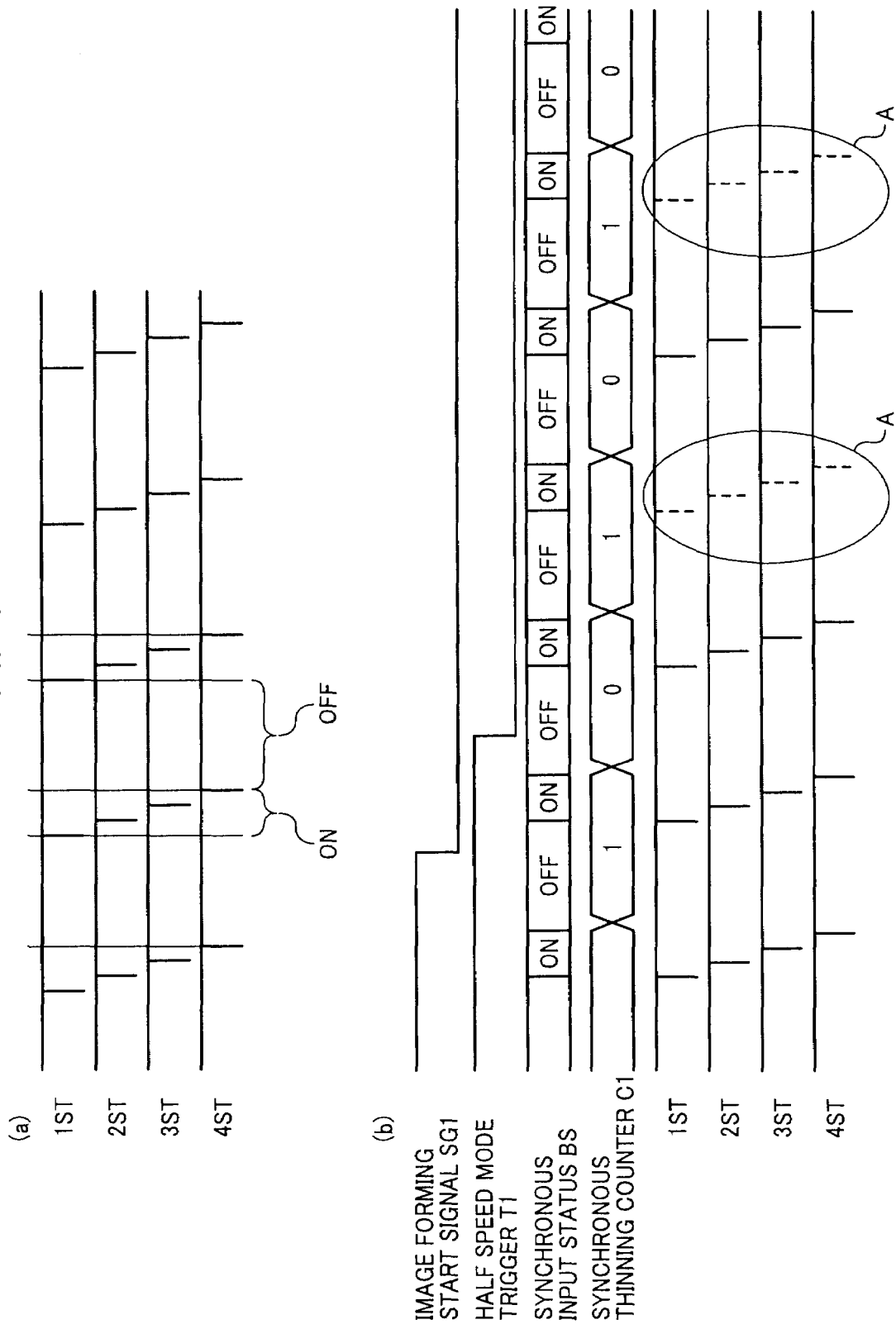
FIG. 5 is a timing chart for explaining thinning processing, performed by the control section of FIG. 4, according to an example embodiment of the present invention.

FIG. 5 illustrates a timing chart for explaining thinning processing, performed by the arbitration unit 101, according to an example embodiment of the present invention. FIG. 5(a) is a timing chart for explaining the time at which the synchronous signal is output when the image forming apparatus 101 forms a color image at a default image forming speed. As illustrated in FIG. 5(a), for each one of the image forming stations 1ST to 4ST, there is a time period in which the synchronous signal 7 is input to the synchronous control unit 6, and a time period in which the synchronous signal 7 is not input to the synchronous control unit 6. For the illustrative purpose, it is assumed that the synchronous control unit 6 is in the "ON" state when there is at least one of the synchronous signals 7 is input, and the synchronous control unit 6 is in the "OFF" state when there is none of the synchronous signals 7 is input. In this example, the arbitration unit 101 determines the timing for applying thinking processing such that thinning processing is applied to the synchronous signals 7 only when the synchronous control unit 6 is in the "OFF" state. This suppresses the negative influence that may be otherwise caused by the thinning processing especially when the thinning processing is applied when the synchronous control unit 6 is in the "ON" state.

More specifically, the synchronous control unit 6 stores information regarding the "ON" or "OFF" state of the synchronous control unit 6, for example, in the form of synchronous input status data BS having the "ON" state or the "OFF" state as illustrated in FIG. 5(b). For example, the time at which the light beam enters the synchronous sensor 5 may be detected using at least one of the synchronous signals 7-1ST, 7-2ST, 7-3ST, and 7-4ST output from the synchronous sensor 5. When the light beam entering the synchronous sensor 5 is detected, it is defined that the synchronous input status BS has the "ON" state, that corresponds to the negate state as no thinning processing is to be applied. When the light beam entering the synchronous sensor 5 is not detected, it is defined that the synchronous input status BS has the "OFF" state, that corresponds to the assert state as thinning processing is to be applied. With this function, the synchronous control unit 6 may be operated in the free run mode.

More specifically, in this example, the synchronous control unit 6 may be provided with a synchronous thinning counter, which outputs a counter value C1 as illustrated in FIG. 5(b). The counter value C1 is initially set to be a predetermined number, which is determined based on the target image forming speed. When the image forming is to be reduced by half, the initial counter value C1 of the synchronous thinning counter may be set to "1" to cause the synchronous thinning counter to count from one. When the image forming speed is to be reduced by one third, the initial counter value C1 of the synchronous thinning counter may be set to "2" to count from two. Still referring to FIG. 5(b), when the counter value C1 of the synchronous thinning counter becomes "0", and when the synchronous input status BS has the "OFF" state, the synchronous control unit 6 outputs the synchronous signal SG 4 to allow each one of the image forming stations 1ST to 4ST to turn on the LD 4. When the counter value C1 of the synchronous thinning counter is not "0", or when the synchronous input status BS has the "ON" state, the synchronous control unit 6 does not output the synchronous signal SG4 such that the LD 4 is not turned on.

FIG. 5(b) illustrates an example case in which a half speed mode trigger signal T1 is input to the synchronous control unit 6 after the image forming start signal SG1 is input to the CPU 1a to start image forming operation. In this example, within the synchronous control unit 6, the half speed mode trigger signal T1 is asserted when the synchronous input status BS is in the "OFF" state. When the synchronous input status BS is in the "OFF" state and the counter value C1 of the synchronous thinning counter has the "1" value, i.e., the "AND" condition is met, thinning processing is performed as illustrated in the reference A of FIG. 5(b). In this example, the synchronous signals 7-1ST, 7-2ST, 7-3ST, and 7-4ST, which are respectively output concurrently from the synchronous sensors 5-1ST, 5-2ST, 5-3ST, and 5-4ST, are thinned out.

As described above referring to FIG. 5(b), when the AND condition is satisfied, the surface of the polygon mirror 9 that corresponds to the synchronous signals 7 being thinned out is not used for image formation so as to cause the image data to be formed at a speed half of the default speed. Since the thinning processing is performed during the time period in which none of the synchronous signals enters, synchronization among the image forming stations ST is maintained, thus preventing the color images to be shifted.

Further, the above-described thinning processing may be performed for the image forming speed other than the image forming speed described above. In the above-described example case, one out of a predetermined number N of the synchronous signals 7 may be thinned out to reduce the image forming speed by 1/N. With this thinning processing, one surface out of a predetermined number N of surfaces of the polygon mirror 9 is not used for image formation. Alternatively, a number (N−1) of the synchronous signals 7 out of a predetermined number N of the synchronous signals 7 may be thinned out to reduce the image forming speed by 1/N. With this thinning processing, a number (N−1) of surfaces out of a predetermined number N of surfaces of the polygon mirror 9 is not used for image formation.

Specifically, when the image forming speed is to be reduced by one third (N=3), two synchronous signals 7 that are output at the same time out of three synchronous signals 7 that are output at the same time are thinned out. In another example, when the image forming is to be reduced by one fourth (N=4), three synchronous signals 7 that are output at the same time out of four synchronous signals 7 that are output at the same time are thinned out. In another example, when the image forming speed is to be reduced by two third (N=3), one synchronous signals 7 that are output at the same time out of three synchronous signals 7 that are output at the same time are thinned out. In another example, when the image forming speed is to be reduced by three fourth (N=3), one synchronous signals 7 that are output at the same time out of four synchronous signals 7 that are output at the same time are thinned out.

Figure 6:
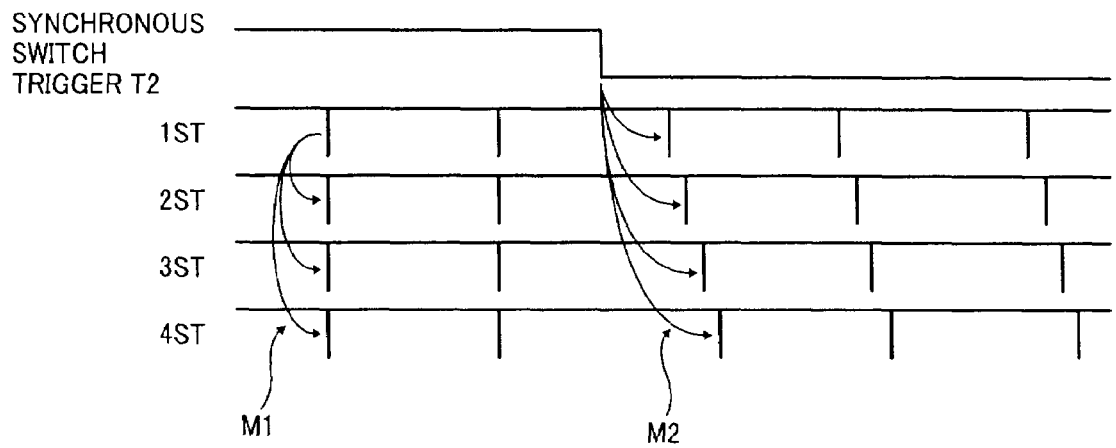
FIG. 6 is a timing chart for explaining thinning processing, performed by the control section of FIG. 4, according to an example embodiment of the present invention.

FIG. 6 illustrates a timing chart for explaining thinning processing, performed by the synchronous control unit 6, according to an example embodiment of the present invention. More specifically, FIG. 6 illustrates a synchronous switch trigger signal T2 input to the synchronous control unit 6, and synchronous signals 7-1ST, 7-2ST, 7-3ST, and 7-4ST respectively output from the synchronous control unit 6.

In this example, in addition to performing thinning processing as described above referring to FIG. 5, the synchronous control unit 6 performs operation of distributing the synchronous signal output for one image forming station to the other image forming stations when the image forming apparatus 101 operates in a first mode M1. In this example, it is assumed that, in the first mode M1, at least the synchronous signal that is used for distribution has been applied with thinning processing, for example, as described above referring to FIG. 5. Further, in this example, the first mode M1 assume that the image data is not written.

For example, the synchronous signal 7-1ST obtained for the first image forming station 1ST is assumed to be generated after applying thinning processing as described above referring to FIG. 5. More specifically, the synchronous control unit 6 may apply thinning processing to the synchronous signal 7-1ST at a determined timing such that thinning processing is applied when no synchronous signal 7-1ST is input. In such case, thinning processing does not have to be performed for the other image forming stations 2ST to 4ST. The synchronous signal 7-1ST is distributed respectively to the other stations 2ST, 3ST, and 4ST as indicated by the first mode M1 of FIG. 6. When the synchronous switch trigger signal T2 is output at a predetermined time, the first mode M1 is switched to a second mode M2 in which the synchronous signals 7-1ST, 7-2ST, 7-3ST, and 7-4ST are respectively controlled for the image forming stations 1ST, 2ST, 3ST, and 4ST. After switching from the first mode M1 to the second mode M2, thinning processing as described above referring to FIG. 5 may be performed for each one of the other image forming stations ST2 to ST4.

Figure 7:
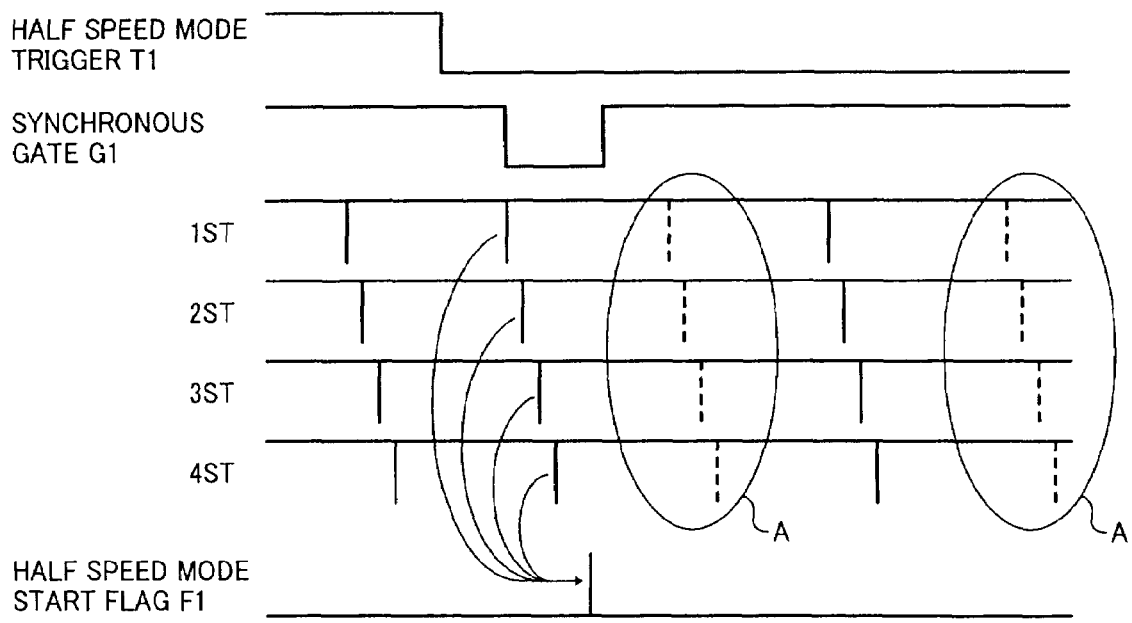
FIG. 7 is a timing chart for explaining thinning processing, performed by the control section of FIG. 4, according to an example embodiment of the present invention.

FIG. 7 illustrates a timing chart for explaining thinning processing, performed by the synchronous control unit 6, according to an example embodiment of the present invention. Referring to FIG. 7, output of a half speed mode trigger signal T1, a synchronous gate signal G1, synchronous signals 7 for the respective stations 1ST to 4ST, and a half speed mode start flag signal F1 are explained.

When the half speed mode trigger signal T1 is asserted, and when one of the plurality of synchronous signals 7 for the image forming stations 1ST, 2ST, 3ST, and 4ST, which is the synchronous signal 1ST in the example case of FIG. 7, is asserted, the synchronous gate signal G1 is asserted. When the synchronous signals 7 for all other image forming stations 2ST, 3ST, and 4ST are input while the synchronous gate signal G1 is being asserted, the half speed mode start flag signal F1 is output. In this manner, the half speed mode start flag signal F1 is generated according to entering of the synchronous signals 7 for all image forming stations ST1, ST2, ST3, and ST4. When the half speed mode start flag signal F1 is output, the synchronous signals 7 each following the previously output synchronous signals 7 that cause generation of the half speed mode start flag signal F1 are thinned out, for example, as indicated by "A" of FIG. 7. Since this is the case in which the image forming speed is reduced by half, every other synchronous signals 7 are thinned out, with each synchronous signals 7 being output at the same time.

In this example, the synchronous gate G1 is previously set so as to be in the negate state when a predetermined time period passes after being asserted. For example, it is assumed that the half speed mode trigger signal T1 is asserted and the synchronous gate signal G1 is asserted right before the synchronous signal 7-3ST for the image forming station 3ST is output, the synchronous control unit 6 detects the synchronous signal 7-3ST and the synchronous signal 7-4ST, but detects no following synchronous signals for a predetermined time period until when the synchronous signal 7-1ST for the next cycle is detected. The assert width of the synchronous gate G1 is previously set so as to be less than one cycle of the synchronous signals 7 detected for the default image forming speed. This prevents the half speed mode start flag F1 to be generated when the half speed mode trigger T1 is input in the middle of the cycle. In such case, the half speed mode start flag F1 may send notification to the CPU 1a indicating that the predetermined time period has passed. Upon receiving the notification, the CPU 1a may again input a half speed mode trigger signal T1 to the synchronous control unit 6.

As described above referring to any one of FIGS. 4 to 7, the synchronous control unit 6 of the arbitration unit 101 may be provided with any one of:

a function of determining a timing for applying thinning processing to the synchronous signals 7 output from the synchronous detectors 5 when an instruction for forming an image at a reduced image forming speed is received;

a function of applying thinning processing to the synchronous signals 7 at the determined timing such that one out of a predetermined number N of synchronous signals 7, or (N−1) number of synchronous signals 7 out of a predetermined number N of synchronous signals 7, are thinned out to generate synchronous signals SG4;

a function of outputting the synchronous signals SG4, which is used by the LD lighting control unit 1b to generate a control signal for controlling lighting of the LD 4 such that a desired number of LD 4 is turned on at a desired timing;

a function of generating synchronous input status data BS to control the time for applying thinning processing;

a function of changing from a first mode in which one of the plurality of synchronous signals 7 to which thinning processing is applied is used for all image forming stations, to a second mode in which a plurality of synchronous signals 7 to which thinning processing is applied is used for the respective image forming stations; and a function of outputting a synchronous gate signal G1 and a function of outputting a half speed mode start flag signal F1 to control the time for applying thinning processing.

Figure 8:
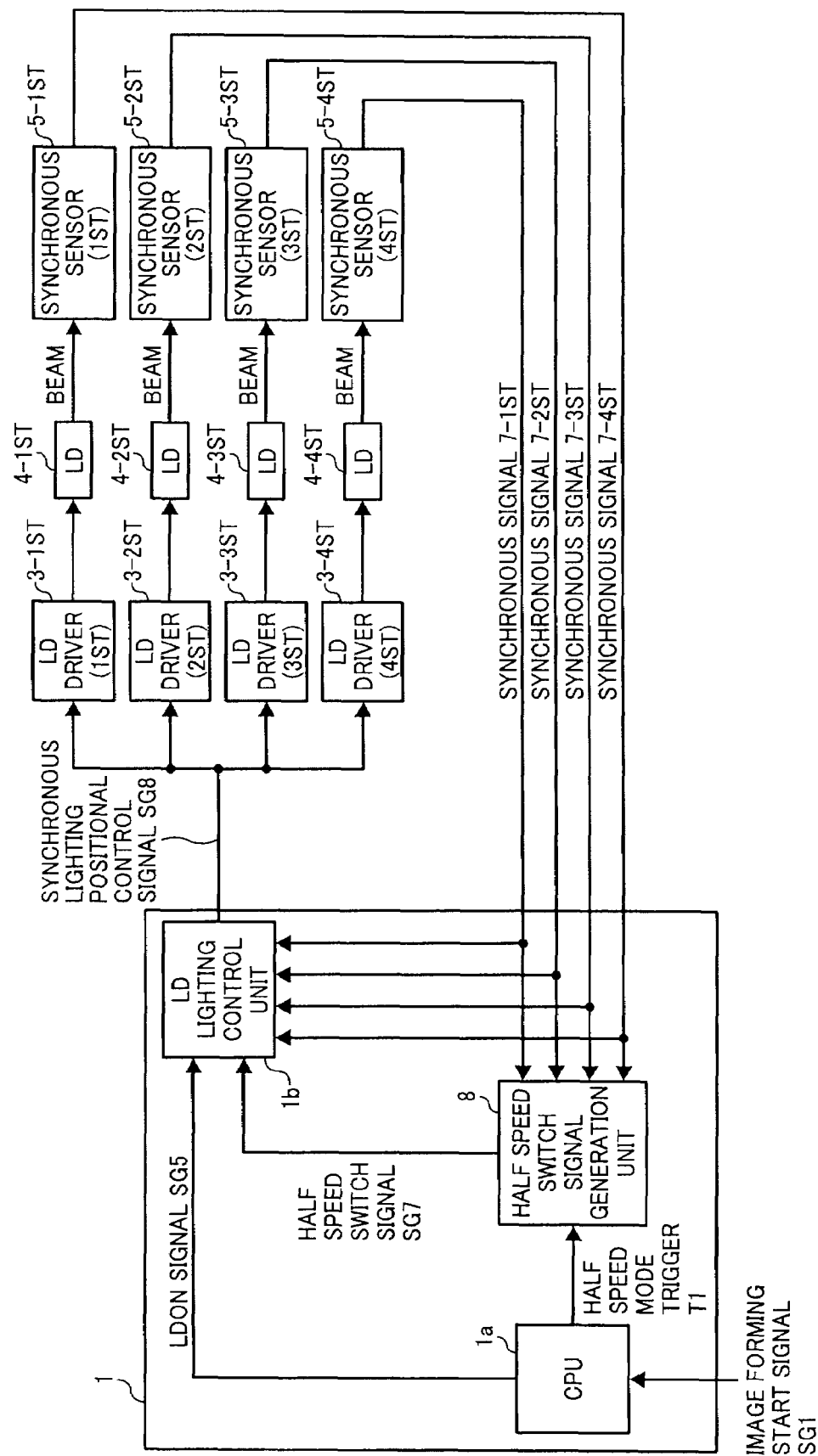
FIG. 8 is a block diagram illustrating a control section of the optical scanning device of FIG. 2, according to an example embodiment of the present invention.
Figure 9:
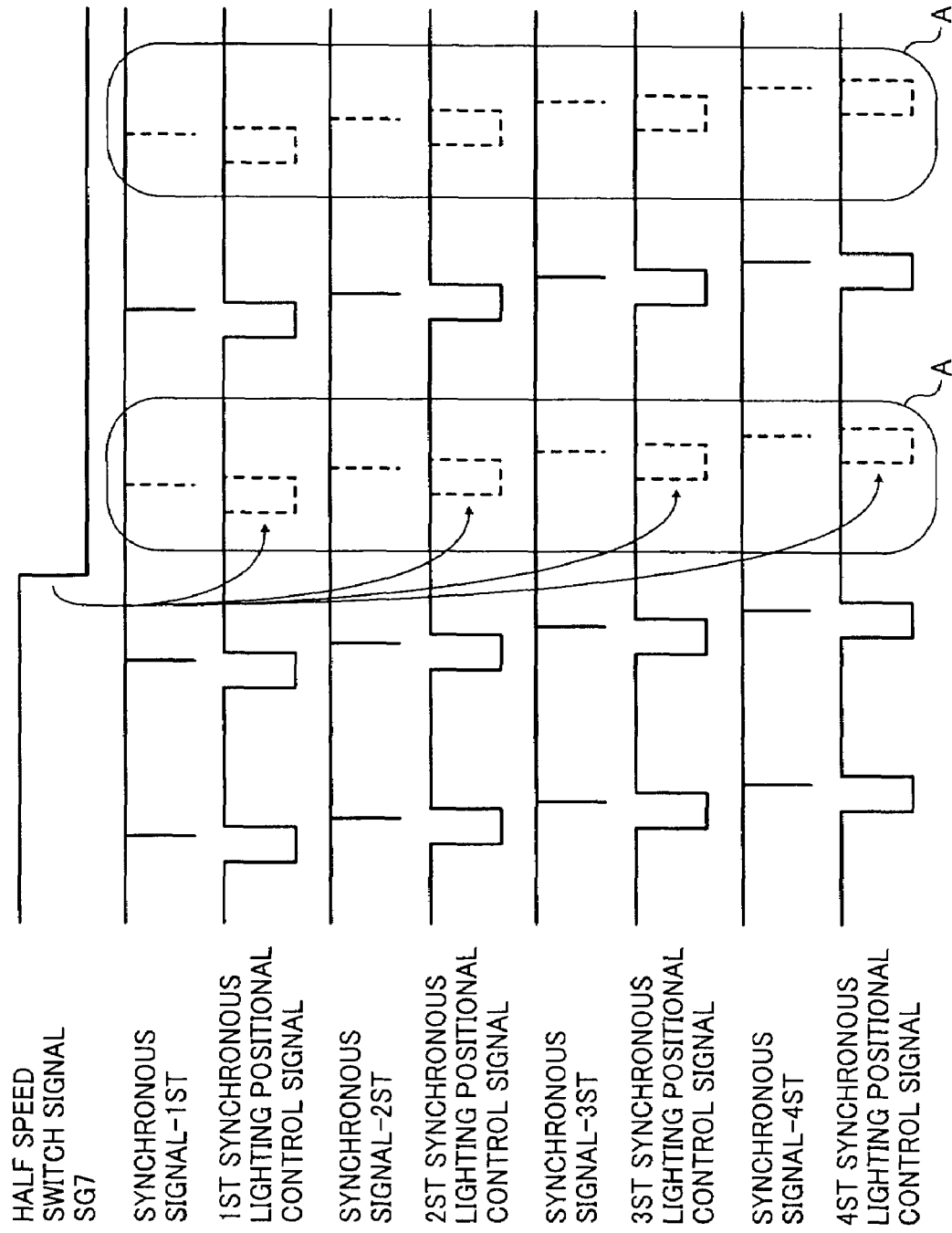
FIG. 9 is a timing chart for explaining thinning processing, performed by the control section of FIG. 8, according to an example embodiment of the present invention.

Referring now to FIG. 8, an example structure of the image writing control section of FIG. 2 is explained according to an example embodiment of the present invention. FIG. 9 illustrates a timing chart for explaining operation of controlling scanning, performed by the control unit 1 of FIG. 8. In this example, thinning processing is performed by changing the time for lighting the LD 4 such that a predetermined number of surfaces of the polygon mirror 9 are used for image formation.

The image writing control section of FIG. 8 is substantially similar in structure and function to the image writing control section of FIG. 4. The differences include the arbitration unit 101 including a half speed switch signal generation unit 8 and the LD lighting control unit 1b. In this example, the half speed switch signal generation unit 8 outputs a half speed switch signal SG7 to the LD lighting control unit 1b. When the half speed switch signal SG7 is received, the LD lighting control unit 1b determines a timing for applying thinning processing, and applies thinning processing to the synchronous signal 7 received from the synchronous sensor 5 at the determined timing by outputting the synchronous lighting positional control signal SG8. More specifically, as described below, the LD lighting control unit 1b controls the position of the polygon mirror 9 being lighted by the LD 4, or the timing at which the LD 4 is lighted, by outputting the synchronous lighting positional control signal SG8 that instructs the LD driver 3 to apply thinning processing to the synchronous signal 7 at the determined timing.

Referring to FIG. 8, a plurality of synchronous signals 7-1ST, 7-2ST, 7-3ST, and 7-4ST are serially output respectively to the half speed switch signal generation unit 8 and to the LD lighting control unit 1b. The half speed switch signal generation unit 8 outputs a half speed switch signal SG7 to the LD lighting control unit 1b. The CPU 1a inputs a half speed mode trigger signal T1 to the half speed switch signal generation unit 8.

The CPU 1a outputs an LDON signal SG5 to the LD lighting control unit 1b to control the LD drivers 3-1ST, 3-2ST, 3-3ST, and 3-4ST to turn on or off the LDs 4-1ST, 4-2ST, 4-3ST, and 4-4ST at the desired time. Under control of the LD drivers 3-1ST, 3-2ST, 3-3ST, and 3-4ST, the LDs 4-1ST, 4-2ST, 4-3ST, and 4-4ST respectively output light beams to synchronous sensors 5-1ST, 5-2ST, 5-3ST, and 5-4ST. When the light beams are entered, the synchronous sensors 5-1ST, 5-2ST, 5-3ST, and 5-4ST output the synchronous signals 7-1ST, 7-2ST, 7-3ST, and 7-4ST respectively to the LD lighting control unit 1b and the half speed switch signal generation unit 8.

Referring to FIG. 9, an example case in which the image forming speed is reduced by half is explained. When the CPU 1a inputs a half mode switch trigger signal T1 to the half switch signal generation unit 8, the half speed switch signal generation unit 8 sends a half speed switch signal SG7 to the LD lighting control unit 1b. When the half speed switch signal SG7 is asserted, the half speed switch signal generation unit 8 changes the time for lighting the respective one of the LDs 4-1ST, 4-2ST, 4-3ST, and 4-4ST according to the synchronous signals 7-1ST, 7-2ST, 7-3ST, and 7-4ST. The time for lighting the LDs 4 may be changed by outputting a synchronous lighting positional control signal SG 8 to the respective one of the LD drivers 3-1ST, 3-2ST, 3-3ST, and 3-4ST. The LDs 4-1ST, 4-2ST, 4-3ST, and 4-4ST are lighted in synchronization with one another. In this example, the time for lighting the LDs 4-1ST, 4-2ST, 4-3ST, and 4-4ST are changed such that every other surface of the polygon mirror 9 is used for generating the synchronous signals 7-1ST, 7-2ST, 7-3ST, and 7-4ST.

Further, the half speed switch signal generating unit 8 of the arbitration unit 101 may be provided with any one of:

a function of determining a timing for applying thinning processing to the synchronous signals 7 output from the synchronous detectors 5 when an instruction for forming an image at a reduced image forming speed is received via the synchronous control unit 6;

a function of outputting the control signal SG3, such as the synchronous lighting positional control signal SG8, at the determined timing to cause the LD driver 3 to control lighting of the LD 4 such that a desired number of LD 4 is turned on at a desired timing;

a function of causing the LD driver 3 to apply thinning processing to the synchronous signals 7 at the determined timing such that one out of a predetermined number N of synchronous signals 7, or (N−1) number of synchronous signals 7 out of a predetermined number N of synchronous signals 7, are thinned out to generate thinned synchronous signals;

a function of generating synchronous input status data BS to control the time for applying thinning processing;

a function of changing from a first mode in which one of the plurality of synchronous signals 7 to which thinning processing is applied is used for all image forming stations, to a second mode in which a plurality of synchronous signals 7 to which thinning processing is applied is used for the respective image forming stations; and a function of outputting a synchronous gate signal G1 and a function of outputting a half speed mode start flag signal F1 to control the time for applying thinning processing.

For example, referring back to FIG. 6, the half speed switch signal generation unit 8 may output the half speed switch signal SG 7 to the LD lighting control unit 1b at a predetermined time to cause the first mode M1 in which the synchronous signal 7-1ST for the image forming station 1ST is used, to the second mode in which the synchrotrons signals 7-1ST, 7-2ST, 7-3ST, and 7-4ST are used. In this example, the synchronous signal is output for every other surface of the polygon mirror 9 as indicated by A of FIG. 8.

Figure 10:
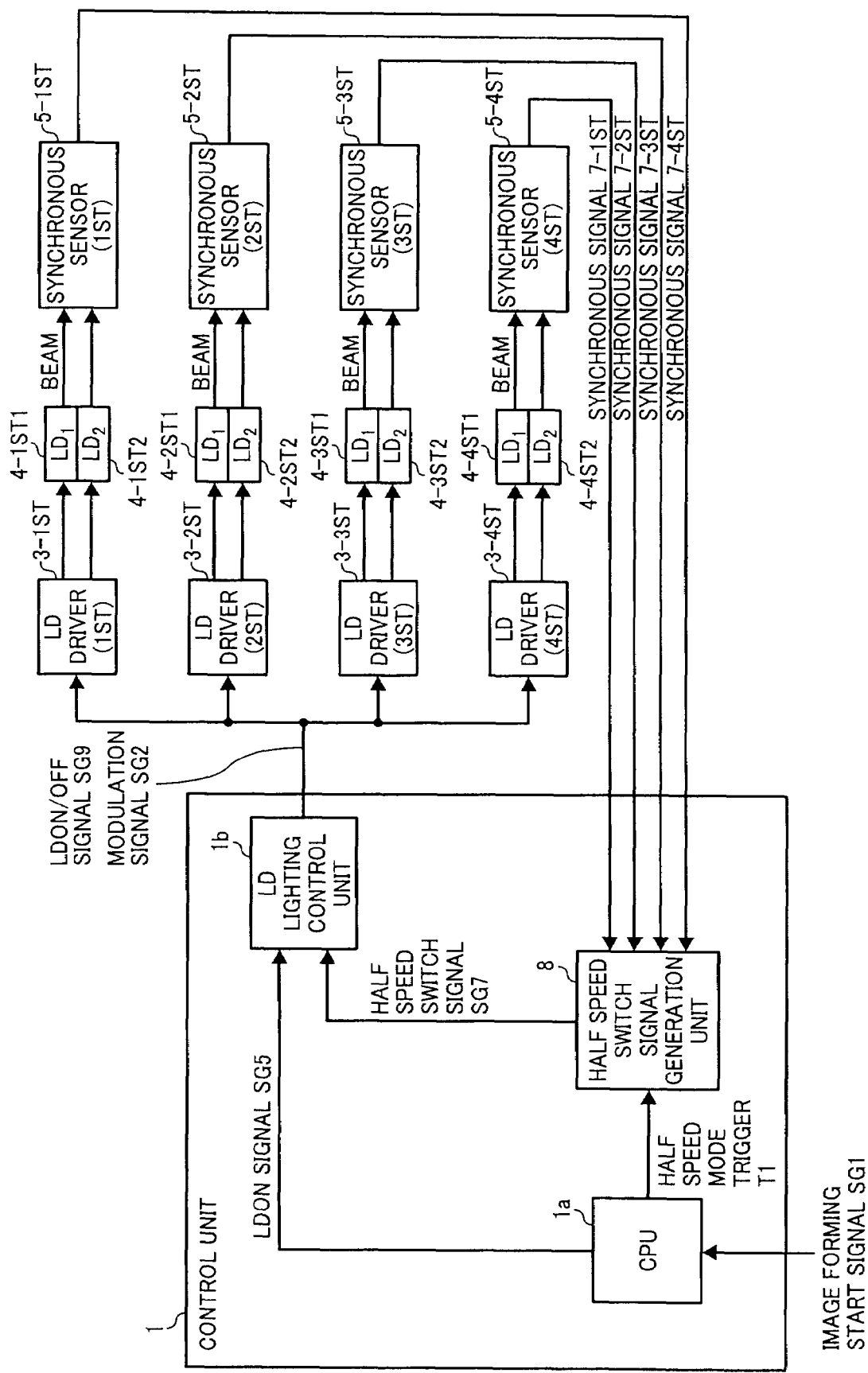
FIG. 10 is a block diagram illustrating a control section of the optical scanning device of FIG. 2, according to an example embodiment of the present invention.

Referring now to FIG. 10, an example structure of the image writing control section of FIG. 2 is explained according to an example embodiment of the present invention. The image writing control section of FIG. 10 is substantially similar in structure and function to the image writing control section of FIG. 8. The differences include that the synchronous signals 7-1ST, 7-2ST, 7-3ST, and 7-4ST are input only to the half speed switch signal generation unit 8, the LDs 4 are respectively replaced by two LD1 and LD2, and the LD lighting control unit 1b outputs an LDON/OFF signal SG9 to control on or off of the LDs 4. More specifically, in this example, the image forming speed may be changed without changing the rotation of polygon mirror 9 based on the LDON/OFF signal SG9, which controls on or off the LDs 4. As illustrated in FIG. 10, for each color, the first LD1 and the second LD2 are provided for the LD 4, resulting in the total of eight LDs.

In the example case of the optical scanning device having the image writing control section of FIG. 10, the shift in color may be observed in the sub-scanning direction due to the thinning processing, when a two beam mode in which the two beams LD1 and LD2 are turned on for image forming is switched to a one beam mode in which one of the two beams LD1 and LD2 is turned on at a predetermined time, for example, during the middle of one cycle.

In order to prevent the modes to be switched at the predetermined time that causes the shift in color, all beams may be turned off before switching from the two beam mode to the one beam mode. In such case, however, some lines are not written during the time period when the beams are turned off.

Figure 11:
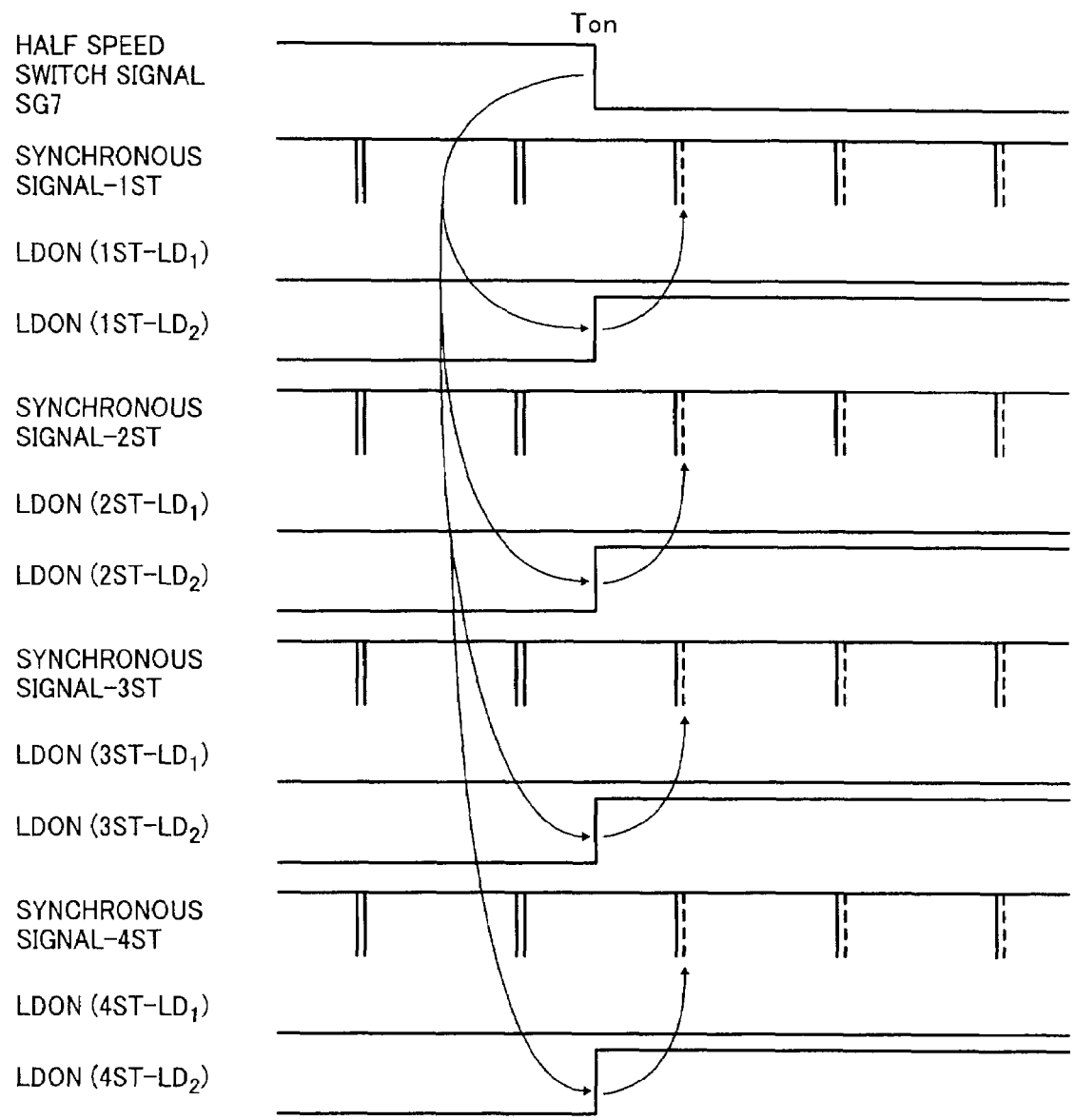
FIG. 11 is a timing chart for explaining thinning processing, performed by the control section of FIG. 10, according to an example embodiment of the present invention.

In view of the above, as illustrated in FIG. 11, when the LDON signals for the first LD1 and second LD2 are asserted, or turned on, for the image forming stations ST1 to ST4, the half speed switch signal SG7 is asserted at a time Ton, which is a desired time between the two synchronous signals 7. Right after the time Ton, the second LDs 2 of the LD 4, which follows the assertion of the half speed switch signal SG7, are negated for the image forming stations TS1 to ST4 to the LDs 2 to turn off. With this operation, only the first LD1 is turned on for each one of the image forming stations ST1 to ST4. This operation of turning off the second LD2 is repeated for all second LDs 2 that are input after the assertion of the half speed switch signal SG7.

As described above referring to any one of FIGS. 10 and 11, only one LD 4 out of a plurality of LDs 4 is turned off for all colors at the timing between the consecutive synchronous signals. This allows the image forming speed to be reduced without changing the rotation of the polygon mirror 9, or the polygon motor, while preventing the shift in color.

More specifically, in this example, the arbitration unit 101 determines the timing for applying thinning processing such that thinning processing is applied when none of the synchronous signals 7 is input as described above referring to any one of FIGS. 4 to 7.

Still referring to FIG. 11, the first LD1 and the second LD2 respectively for the image forming stations ST1, ST2, ST3, and ST4 are referred to as 1ST-LD1, 1ST-LD2, 2ST-LD1, 2ST-LD2, 3ST-LD1, 3ST-LD2, 4ST-LD1, and 4ST-LD2.

Further, in this example, when the LDON signal SG5 is received from the CPU 1a and when the half speed switch signal SG7 is received from the half speed switch signal generation unit 8, the LD lighting control unit 1b outputs the LDON/OFF signal SG8 to the LD driver 3 at the timing illustrated in FIG. 11 to cause on or off of the first LD1 and the second LD2. The LD driver 3 turns on or off the first LD1 and the second LD2 according to the LDON/OFF signal SG8.

In this example, in the default image forming mode, image formation is performed using eight beams. When the default image forming mode is changed to the half image forming mode, image formation is performed using four beams. Alternatively, when the default image forming mode is changed to a ¾ image forming mode, image formation is performed using six beams.

Further, in this example, the half speed switch signal generating unit 8 of the arbitration unit 101 may be provided with any one of:

a function of determining a timing for applying thinning processing to the synchronous signals 7 output from the synchronous detectors 5 when an instruction for forming an image at a reduced image forming speed is received via the synchronous control unit 6;

a function of outputting the control signal SG3, such as the LD ON/OFF signal SG9, at the determined timing to cause the LD driver 3 to control lighting of the LD 4 such that a desired number of LD 4 is turned on at a desired timing;

a function of causing the LD driver 3 to apply thinning processing to the synchronous signals 7 at the determined timing such that one out of a predetermined number N of synchronous signals 7, or (N−1) number of synchronous signals 7 out of a predetermined number N of synchronous signals 7, are thinned out to generate thinned synchronous signals;

a function of generating synchronous input status data BS to control the time for applying thinning processing;

a function of changing from a first mode in which one of the plurality of synchronous signals 7 to which thinning processing is applied is used for all image forming stations, to a second mode in which a plurality of synchronous signals 7 to which thinning processing is applied is used for the respective image forming stations; and a function of outputting a synchronous gate signal G1 and a function of outputting a half speed mode start flag signal F1 to control the time for applying thinning processing.

Figure 12:
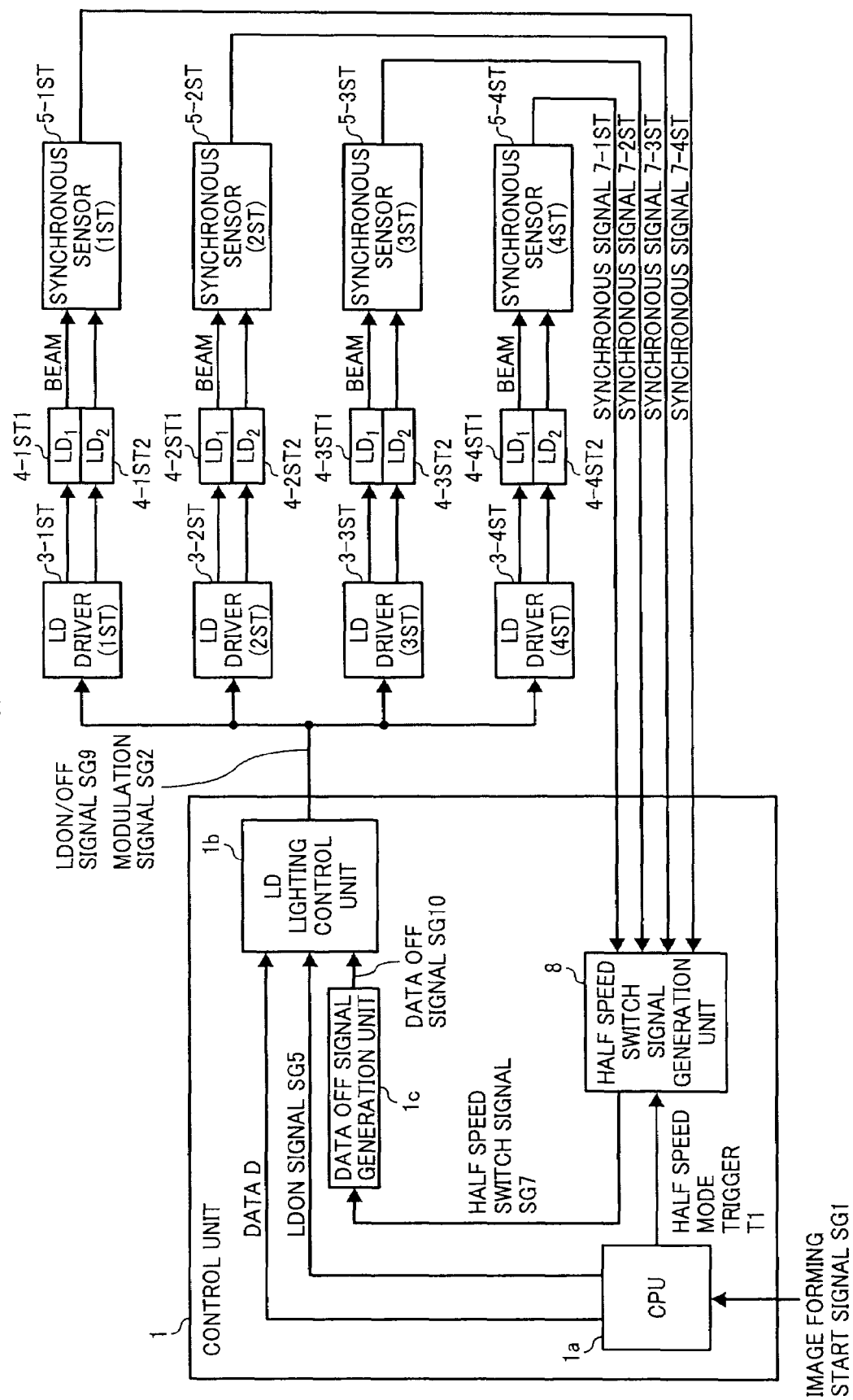
FIG. 12 is a block diagram illustrating a control section of the optical scanning device of FIG. 2, according to an example embodiment of the present invention.

Referring now to FIG. 12, an example structure of the image writing control section of FIG. 2 is explained according to an example embodiment of the present invention. The image writing control section of FIG. 12 is substantially similar in structure and function to the image writing control section of FIG. 10. The differences include the addition of a data off signal generation unit 1c upstream of the LD lighting control unit 1b. The half speed switch signal generation unit 8 outputs the half speed switch signal SG7 to the data off signal generation unit 1c. The data off generation signal generation unit 1c generates a data off signal SG10, and inputs the data off signal SG10 to the LD lighting control unit 1b. The CPU 1a sends the data D to the LD lighting control unit 1b.

In this example, rather than turning off the second LD2 as described above referring to any one of FIGS. 10 and 11, the LD lightning control unit 1b controls so as not to send a modulation signal SG2. The data off signal generation unit 1c generates the data off signal SG10 according to the half speed switch signal SG7 output from the half speed switch signal generation unit 8. The LD lighting control unit 1b switches a data path according to the data off signal SG 10. When two LDs including the first LD1 and the second LD2 are used for each color, the data for each color is to be processed by the first LD1 and the second LD2. For example, when the data off signal for the second LD2 is received, the LD lighting control unit 1b switches a data path such that only the first LD1 is used for image formation. In such case, the second LD2 is made in the standby state, through which only bias current flows.

FIG. 12 illustrates a timing chart for explaining the operation described above referring to FIG. 11. When the half speed switch signal SG7 is negated, the first LD1 and the second LD2 are turned on for all of the image forming stations ST1 to ST4. When the half speed switch signal SG7 is asserted at the timing Ton in a substantially similar manner as described above referring to FIG. 10, the default image forming mode is switched to the half image forming mode. In such case, until when the half speed switch signal SG7 is asserted, the data off signals for the first LD1 and the second LD2 for the image forming stations ST1 to ST4, which are LD4-1ST1, LD4-1ST2, LD4-2ST1, LD4-2ST2, LD4-3ST1, LD4-3ST2, LD4-4ST1, and LD4-4ST2, are negated. The modulation signal SG2 causes the data D to be sent to the LD driver 3. For each color, image formation of the data D is performed using the first LD1 and the second LD2.

Figure 13:
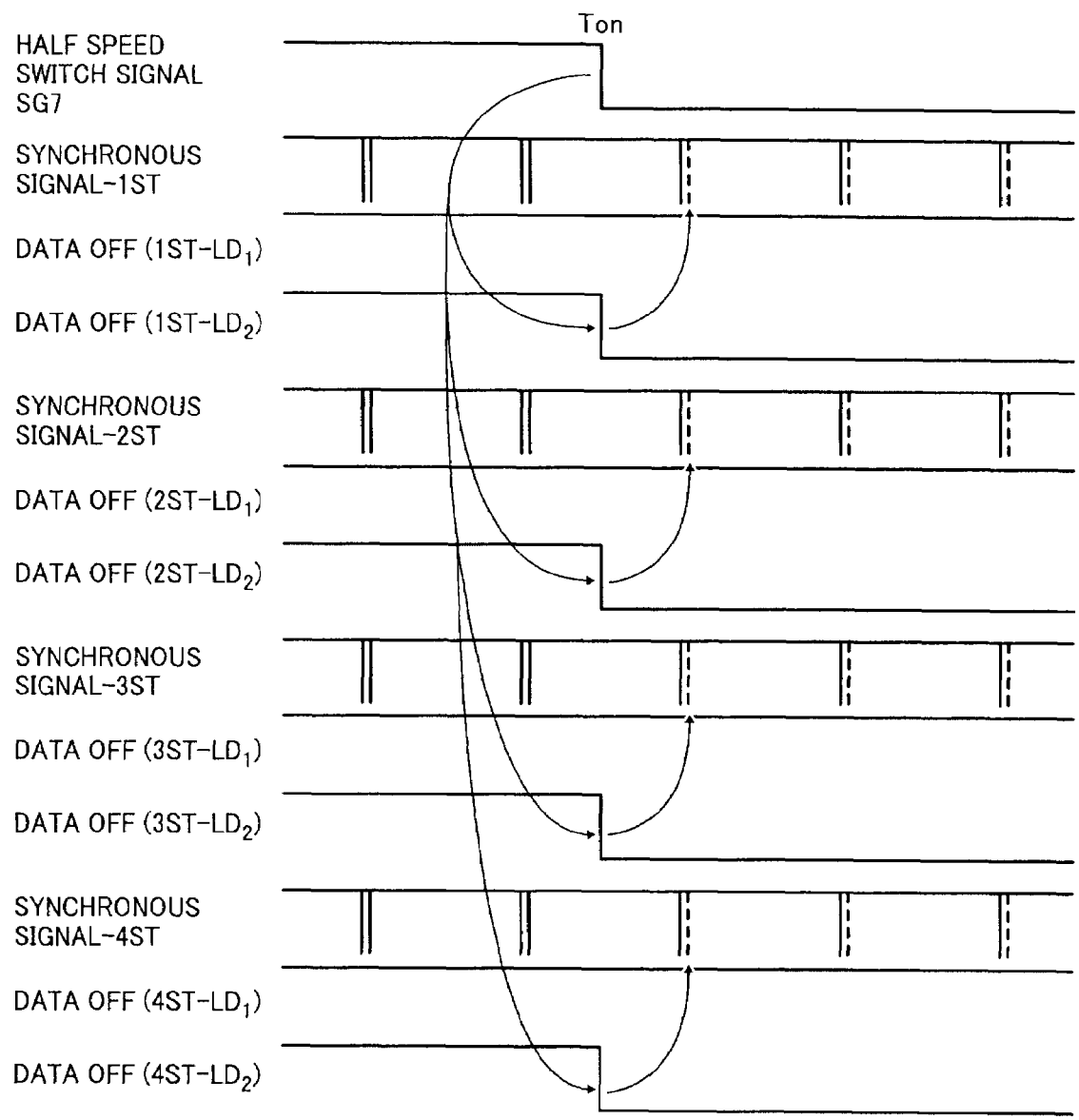
FIG. 13 is a timing chart for explaining thinning processing, performed by the control section of FIG. 12, according to an example embodiment of the present invention.

When the half speed switch signal SG7 is asserted at the timing Ton, the data off signals for the second LD2 for each image forming station are asserted. This prevents the image data to be sent to the second LD2. In such case, the second LD2 is in the standby state. The synchronous signal 7 that corresponds to the second LD2 is thinned out such that image formation is performed using only the synchronous signal that corresponds to the first LD1. Referring to FIG. 13, the first LD1 and the second LD2 for the image forming stations ST1 to ST4 are referred to as the 1ST-LD1, 1ST-LD2, 2ST-LD1, 2ST-LD2, 3ST-LD1, 3ST-LD2, 4ST-LD1, and 4ST-LD2.

As described above referring to any one of FIGS. 12 and 13, only one LD 4 out of a plurality of LDs 4 is turned off for all colors at the timing between the consecutive synchronous signals. This allows the image forming speed to be reduced without changing the rotation of the polygon mirror 9, or the polygon motor, while preventing the shift in color.

More specifically, in this example, the arbitration unit 101 determines the timing for applying thinning processing such that thinning processing is applied when none of the synchronous signals 7 is input as described above referring to any one of FIGS. 4 to 7.

In this example, in the default image forming mode, image formation is performed using eight beams. When the default image forming mode is changed to the half image forming mode, image formation is performed using four beams. Alternatively, when the default image forming mode is changed to a ¾ image forming mode, image formation is performed using six beams. More specifically, in the example case of ¾ image forming mode, the data off signals are asserted for two beams other than the six beams, while the data off signals are negated for the six beams.

Further, the data off signal generation unit 1c of the arbitration unit 101 may be provided with any one of:

a function of determining a timing for applying thinning processing to the synchronous signals 7 output from the synchronous detectors 5 when an instruction for forming an image at a reduced image forming speed is received via the synchronous control unit 6;

a function of outputting a control signal, such as the data off signal SG10, at the determined timing to cause the LD driver 3 to control the data flow to the LD 4 such that a desired number of LD 4 forms an image according to the modulation signal SG2 at a desired timing;

a function of causing the LD driver 3 to apply thinning processing to the synchronous signals 7 at the determined timing such that one out of a predetermined number N of synchronous signals 7, or (N−1) number of synchronous signals 7 out of a predetermined number N of synchronous signals 7, are thinned out to generate thinned synchronous signals;

a function of generating synchronous input status data BS to control the time for applying thinning processing;

a function of changing from a first mode in which one of the plurality of synchronous signals 7 to which thinning processing is applied is used for all image forming stations, to a second mode in which a plurality of synchronous signals 7 to which thinning processing is applied is used for the respective image forming stations; and a function of outputting a synchronous gate signal G1 and a function of outputting a half speed mode start flag signal F1 to control the time for applying thinning processing.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An apparatus for controlling an optical scanning device, the apparatus comprising:
    a light source configured to irradiate a plurality of light beams;
    a rotatable polyhedron deflector configured to deflect the plurality of light beams to form a plurality of color images on a plurality of image forming sections at a first image forming speed;
    a plurality of synchronous detectors configured to detect the plurality of light beams deflected by the rotatable polyhedron deflector and to output a plurality of first synchronous signals; and
    an arbitration unit configured to receive an instruction for forming the plurality of color images at a second image forming speed without changing the rotational speed of the rotatably polyhedron deflector; to determine a timing for applying thinning processing to the plurality of first synchronous signals to generate a plurality of second synchronous signals; and to cause the light source to irradiate at least one of the plurality of light beams according to the plurality of second synchronous signals.

2. The apparatus of claim 1, wherein the arbitration unit is configured to determine the timing for applying thinning processing so as to cause the thinning processing to be applied when none of the plurality of first synchronous signals is input to the arbitration unit.

3. The apparatus of claim 2, wherein the arbitration unit comprises:
    a switch signal generation unit configured to output a switch signal when the instruction for forming the plurality of color images at a second image forming speed is received; and
    a light source control unit configured to receive the plurality of first synchronous signals from the plurality of synchronous detectors and to output a light control signal at the determined timing for applying thinning processing to cause the light source to irradiate at least one of the plurality of light beams at a timing determined by the light control signal such that the light source irradiates the at least one of the plurality of light beams according to the plurality of second synchronous signals.

4. The apparatus of claim 2, wherein the arbitration unit comprises:
    a synchronous control unit configured to receive the plurality of first synchronous signals from the plurality of synchronous detectors, to apply thinning processing to the plurality of first synchronous signals at the determined timing for applying thinning processing to generate the plurality of second synchronous signals, and to output the plurality of second synchronous signals; and
    a light source control unit configured to output a light control signal to the light source according to the plurality of second synchronous signals to cause the light source to irradiate the at least one of the plurality of light beams according to the plurality of second synchronous signals.

5. The apparatus of claim 2, wherein the arbitration unit comprises:
    a switch signal generation unit configured to output a switch signal when the instruction for forming the plurality of color images at a second image forming speed is received;
    a light source control unit configured to receive the plurality of first synchronous signals from the plurality of synchronous detectors and to output an image data signal to the light source; and
    a data off signal generation unit provided between the switch signal generation unit and the light source control unit and configured to output a data off signal at the determined timing for applying thinning processing to the light source control unit, wherein the data off signal prevents the image data signal to be sent from the light source control unit to the light source such that the light source irradiates the at least one of the plurality of light beams according to the plurality of second synchronous signals.

6. The apparatus of claim 2, wherein the arbitration unit is further configured to:
    store status information indicating whether the arbitration unit is in a first state in which at least one of the plurality of first synchronous signals is input to the arbitration unit or in a second state in which none of the plurality of first synchronous signals is input to the arbitration unit, wherein:
    the arbitration unit is configured to determine the timing for applying thinning processing based on the status information so as to cause the thinning processing to be applied when the arbitration unit is in the second state.

7. The apparatus of claim 2, wherein the arbitration unit is configured to apply thinning processing in two modes including:
    a first mode in which the arbitration unit is configured to apply thinning processing to one of the plurality of first synchronous signals corresponding to a selected one of the plurality of image forming sections at the determined timing to generate a second synchronous signal for the selected one of the plurality of image forming sections, and to cause the light source to irradiate the at least one of the plurality of light beams according to the second synchronous signal for the selected one of the plurality of image forming sections; and
    a second mode in which the arbitration unit is configured to apply thinning processing to the other one of the plurality of first synchronous signals corresponding to the other one of the plurality of image forming sections at the determined timing to generate a second synchronous signal for the other one of the plurality of image forming sections, and to cause the light source to irradiate the at least one of the plurality of light beams according to the plurality of second synchronous signals.

8. The apparatus of claim 2, wherein the arbitration unit is further configured to:
output a synchronous gate signal when at least one of the plurality of first synchronous signals is input to the arbitration unit after the instruction for forming the plurality of images at a second image forming speed is received; and
output a start signal when all of the plurality of first synchronous signals for the plurality of image forming sections are input to the arbitration unit after the synchronous gate signal is output,
wherein the arbitration unit is configured to determine the timing for applying thinning processing based on the start signal such that the thinning processing is applied when the start signal is output.

9. The apparatus of claim 8, wherein the synchronous gate signal has an assert width that is made less than one cycle of the plurality of first synchronous signals being output at the first image forming speed.

10. The method of claim 8, further comprising:
outputting a synchronous gate signal when at least one of the plurality of first synchronous signals is output after the instruction for forming the plurality of images at a second image forming speed is received; and
outputting a start signal when all of the plurality of first synchronous signals for the plurality of image forming sections are output after the synchronous gate signal is output,
wherein the timing for applying thinning processing is determined based on the start signal such that the thinning processing is applied when the start signal is output.

11. The method of claim 10, wherein the synchronous gate signal has an assert width that is made less than one cycle of the plurality of first synchronous signals being output at the first image forming speed.

12. A method of controlling an optical scanning device, the method comprising:
providing a light source to irradiate a plurality of light beams;
deflecting the plurality of light beams using a rotatable polyhedron deflector to form a plurality of color images on a plurality of image forming sections at a first image forming speed;
outputting a plurality of first synchronous signals when the plurality of light beams deflected by the rotatable polyhedron deflector is detected;
receiving an instruction for forming the plurality of color images at a second image forming speed without changing the rotational speed of the rotatably polyhedron deflector;
determining a timing for applying thinning processing to the plurality of first synchronous signals to generate a plurality of second synchronous signals; and
causing the light source to irradiate at least one of the plurality of light beams according to the plurality of second synchronous signals.

13. The method of claim 12, wherein the timing for applying thinning processing is determined such that the thinning processing is applied when none of the plurality of first synchronous signals is output.

14. The method of claim 13, further comprising:
outputting a switch signal when the instruction for forming the plurality of color images at a second image forming speed is received; and
outputting a light control signal at the determined timing for applying thinning processing to cause the light source to irradiate at least one of the plurality of light beams at a timing determined by the light control signal such that the light source irradiates the at least one of the plurality of light beams according to the plurality of second synchronous signals.

15. The method of claim 13, further comprising:
applying thinning processing to the plurality of first synchronous signals at the determined timing for applying thinning processing to generate the plurality of second synchronous signals; and
outputting a light control signal to the light source according to the plurality of second synchronous signals to cause the light source to irradiate the at least one of the plurality of light beams according to the plurality of second synchronous signals.

16. The method of claim 13, further comprising:
outputting a switch signal when the instruction for forming the plurality of color images at a second image forming speed is received;
outputting a data off signal at the determined timing for applying thinning processing to prevent the image data signal to be sent to the light source such that the light source irradiates the at least one of the plurality of light beams according to the plurality of second synchronous signals.

17. The method of claim 13, further comprising:
storing status information indicating whether at least one of the plurality of first synchronous signals is output or none of the plurality of first synchronous signals is output, wherein:
the timing for applying thinning processing is determined based on the status information so as to cause the thinning processing to be applied when none of the plurality of first synchronous signals is output.

18. The method of claim 13, wherein the thinning processing is performed in two modes including:
a first mode in which thinning processing is applied to one of the plurality of first synchronous signals corresponding to a selected one of the plurality of image forming sections at the determined timing to generate a second synchronous signal for the selected one of the plurality of image forming sections, and the light source is caused to irradiate the at least one of the plurality of light beams according to the second synchronous signal for the selected one of the plurality of image forming sections; and
a second mode in which thinning processing is applied to the other one of the plurality of first synchronous signals corresponding to the other one of the plurality of image forming sections at the determined timing to generate a second synchronous signal for the other one of the plurality of image forming sections, and the light source is caused to irradiate the at least one of the plurality of light beams according to the plurality of second synchronous signals.

* * * * *